United States Patent
Yeh et al.

(10) Patent No.: US 8,744,014 B2
(45) Date of Patent: Jun. 3, 2014

(54) METHOD AND APPARATUS FOR COORDINATED MIMO SIGNAL TRANSMISSION AMONG MULTIPLE CELLS IN WIRELESS OFDM SYSTEMS

(75) Inventors: Chu-Jung Yeh, Xinzhuang (TW); Li-Chun Wang, Hsinchu (TW); I-Kang Fu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 882 days.

(21) Appl. No.: 12/766,330

(22) Filed: Apr. 23, 2010

(65) Prior Publication Data

US 2010/0272218 A1    Oct. 28, 2010

Related U.S. Application Data

(60) Provisional application No. 61/172,331, filed on Apr. 24, 2009.

(51) Int. Cl.
    *H04L 27/22*    (2006.01)
(52) U.S. Cl.
    USPC ........... 375/330; 375/260; 375/262; 375/265; 375/267; 375/295; 375/298; 375/316; 375/328; 375/329
(58) Field of Classification Search
    CPC . H04L 27/2332; H04L 27/2331; H04L 27/22; H04L 25/4904; H04L 7/0331; H04L 27/2647; H04L 5/0007; H04L 27/2657; H04L 27/2662; H04L 5/0048
    USPC ......... 375/330, 260, 262, 265, 267, 295, 298, 375/316, 328, 329; 370/203, 204, 205, 208, 370/209, 210
    See application file for complete search history.

(56) References Cited

U.S. PATENT DOCUMENTS

| | | | |
|---|---|---|---|
| 6,002,935 A | 12/1999 | Wang | |
| 6,839,565 B2 | 1/2005 | Sarkkinen et al. | |
| 7,031,277 B2 | 4/2006 | Choi et al. | |
| 7,403,789 B2 | 7/2008 | Takano et al. | |
| 7,454,210 B2 | 11/2008 | Rinne et al. | |
| 2009/0296635 A1* | 12/2009 | Hui et al. | 370/328 |
| 2010/0008311 A1* | 1/2010 | Oh et al. | 370/329 |
| 2011/0038308 A1* | 2/2011 | Song et al. | 370/328 |

OTHER PUBLICATIONS

Khan, "LTE for 4G mobile broadband: air interface technologies and performance", Cambridge University Press 2009, pp. 419-420.

(Continued)

*Primary Examiner* — Dhaval Patel
(74) *Attorney, Agent, or Firm* — Chen Yoshimura LLP

(57) ABSTRACT

A FFR (fractional frequency reuse)-based network MIMO (multiple-input multiple-output) transmission architecture in a cellular system that employs cell sectoring using directional antennas. Each cell is sectorized into three outer sectors using three directional antennas which transmit in three different directions using three different frequency subbands. The cell sectors are arranged based on a frequency partition scheme so that three sectors in three neighboring cells form a coordinated group for network MIMO transmission. A regular and a rearranged frequency partition are described. Further, a practical implementation of SON (self organizing network)-based three-cell FFR-based network MIMO for a wireless OFDM system is described. In this implementation, a server connected to multiple base stations (BSs) defines multiple coordinated groups for coordinated MIMO transmission, and the BSs within each coordinated group negotiate a common radio resource region (a composite time-frequency region), and selects a serving mobile station to participate in the coordinated MIMO transmission.

22 Claims, 11 Drawing Sheets

(56) References Cited

OTHER PUBLICATIONS

Wang, "A New Cellular Architecture Based on An Interleaved Cluster Concept", IEEE Transactions on Vehicular Technology, Nov. 1999, vol. 48, No. 6, pp. 1809-1818.

Somekh et al., "Distributed multi-cell zero-forcing beamforming in cellular downlink channels", IEEE Global Telecommunications Conference, Nov. 2006, pp. 1-6.

Jing et al. "Multicell downlink capacity with coordinated processing", EURASIP Journal on Wireless Communications and Networking, 2008, Article ID 586878, pp. 1-19.

Karakayali et al., "Network coordination for spectrally efficient communications in cellular systems", IEEE Transactions on Wireless Communications, Aug. 2006, vol. 13, No. 4, pp. 56-61.

Liang et al., "Evolution of base stations in cellular networks: denser deployment versus coordination", May 2008, IEEE International conference of communications, pp. 4128-4132.

Lei et al., "A novel multi-cell OFDMA system structure using fractional frequency reuse", Proceedings of IEEE International Symposium Personal, Indoor and Mobile Radio Communications, Sep. 2007, pp. 1-5.

Chiu et al., "Combined partial reuse and soft handover in OFDMA downlink transmission", IEEE Vehicular Technology Conference, May 2008, pp. 1707-1711.

Taiwanese Office Action, dated Jul. 30, 2013, in a counterpart Taiwanese patent application, No. TW 099113020.

* cited by examiner

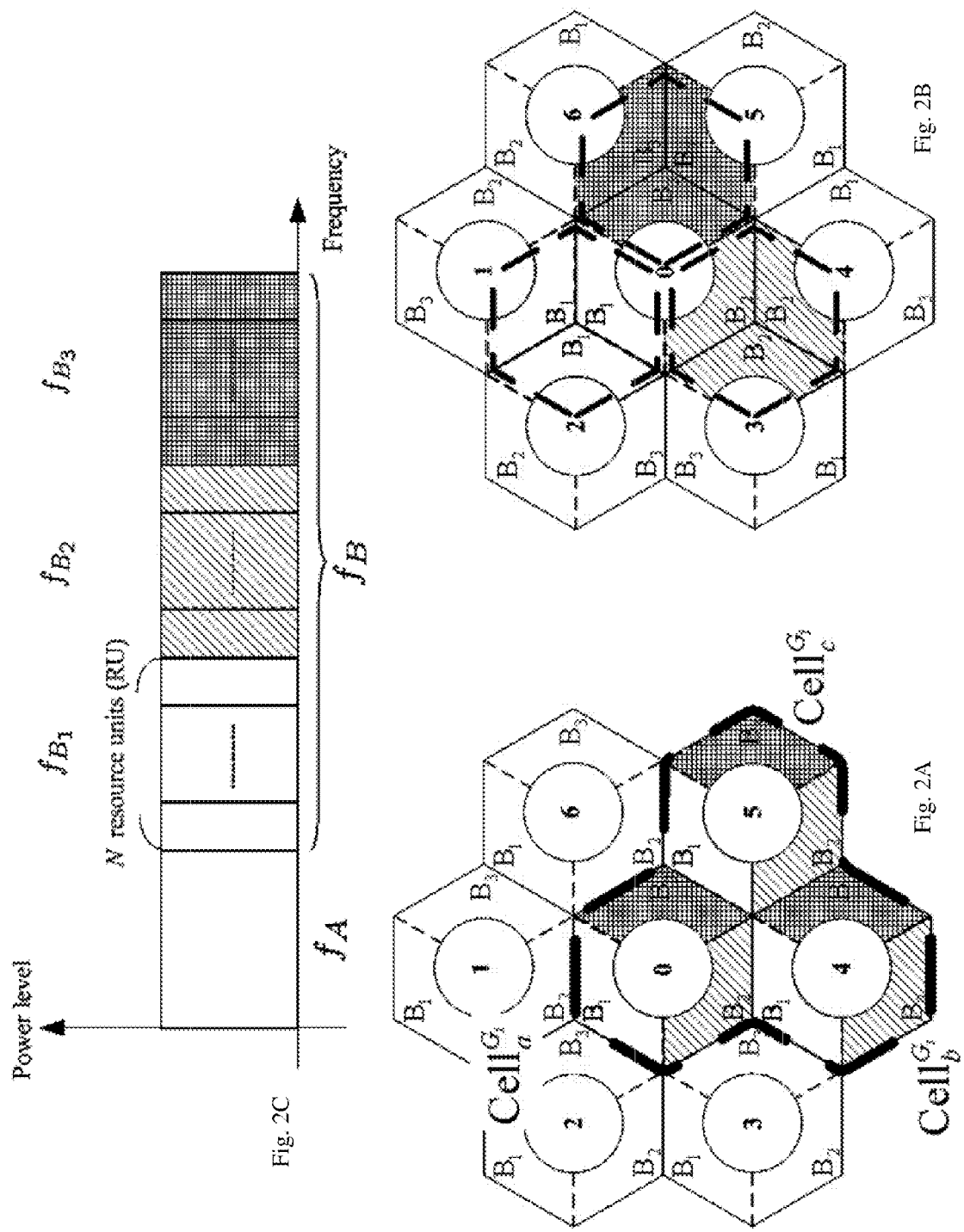

METHOD AND APPARATUS FOR COORDINATED MIMO SIGNAL TRANSMISSION AMONG MULTIPLE CELLS IN WIRELESS OFDM SYSTEMS

This application claims priority under 35 USC §119(e) from U.S. Provisional Patent Application No. 61/172,331, filed Apr. 24, 2009, which is herein incorporated by reference in its entirety.

BACKGROUND OF THE INVENTION

1. Field of the Invention

This invention relates to cellular communications, and in particular, it relates to an FFR-based network MIMO transmission architecture in multi-cell wireless OFDM/OFDMA systems.

2. Description of the Related Art

Network multiple-input multiple-output (MIMO), which has been proposed for potential deployment in fourth generation (4G) wireless system, is a technique aimed to mitigate inter-cell interference and enhance throughput by coordinating multi-cell transmission among a number of geographically separated antennas belongs to the same or different base stations (BS). This kind of multi-BS MIMO techniques improves sector throughput and cell-edge throughput through multi-BS cooperative signaling. Multi-BS joint MIMO processing may be enabled by the BS for one or several mobile stations (MS) when joint precoding is applied in the serving and neighboring cells. Take the example from the wireless broadband system Worldwide Interoperability for Microwave Access (WiMAX), there are two scenarios: closed-loop macro diversity (CL-MD) and collaborative MIMO (Co-MIMO) transmission. For CL-MD transmission, a single MS is served jointly by multiple coordinating BSs. For Co-MIMO transmission, several mobile stations (MS) are served jointly by the multiple coordinating BSs through MU-MIMO scheduling and precoding. Similar concept for multi-BS joint MIMO processing is also proposed in Third Generation Partnership Project (3GPP) Long-Term Evolution-advanced (LTE-A) standard, referred to as coordinated multipoint (CoMP) transmission. There are also two scenarios: joint processing (JP) and coordinated scheduling/coordinated beamforming (CS/CB). Both Co-MIMO and CoMP-JP transmissions (often referred to as network MIMO in research papers) allow multiple coordinated BSs to serve multiple users simultaneously with jointly designed precoding.

A reference that describes network MIMO is M. K. Karakayali, G. J. Foschini, and R. A. Valenzuela, "Network coordination for spectrally efficient communications in cellular systems," IEEE Trans. on Wireless Commun., vol. 13, no. 4, pp. 56-61, August 2006 ("Karakayali et al. 2006"). This reference describes "network coordination as a means to provide spectrally efficient communications in cellular downlink systems. When network coordination is employed, all base antennas act together as a single network antenna array, and each mobile may receive useful signals from nearby base stations." (Id., Abstract.) In this reference, "the objective is to coordinate the base antenna transmissions so that the signals from multiple base antennas can be coherently received to improve signal quality. Among the transmission techniques achieving this objective, two simple forms of coherent coordination are considered . . . : coordination by zero-forcing transmission and coordination by dirty paper coding combined with a limited form of zero forcing." (Id., pages 56-57.)

Several other general approaches are used to mitigate inter-cell interference in conventional cellular systems, including frequency reuse, cell sectoring and spread spectrum. One commonly used technique is to avoid using the same set of frequencies in neighboring cells; that is, a cluster of cells share the entire transmission spectrum. This approach leads to the decrease of the number of available channels within each cell.

A scheme known as fractional frequency reuse (FFR) has been proposed to improve spectrum efficiency by applying the reuse partition technique. FFR, also called frequency partition or reuse partition, allows different frequency reuse factors to be applied over different frequency partitions during the designed period for transmission. FIG. 9 shows a conventional FFR scheme for omni-cells. In this and some other illustrations in this disclosure, the cell shape is shown as hexagons (sometimes also referred to as diamond-shaped cells). The entire useable frequency range is partitioned into an inner frequency band $f_A$ for use in inner cell regions (cell center) of all cells, and an outer frequency band $f_B$ for used in outer cell regions (cell edge). The frequency band $f_B$ is further partitioned into three subbands $f_{B1}$, $f_{B2}$, and $f_{B3}$; as shown in FIG. 9, adjoining (neighboring) cells use different subbands in the outer cell regions. In the illustrated example, adjoining cells 0, 6 and 5 use subbands $f_{B1}$, $f_{B2}$, and $f_{B3}$, respectively for their outer cell regions. Only one of the three subbands $f_{B1}$, $f_{B2}$, and $f_{B3}$ is used by each cell (e.g. cell 0 does not use subbands $f_{B2}$ and $f_{B3}$). In such an FFR scheme, signal quality at cell edge is improved at the cost of lower spectrum usage.

To improve spectrum efficiency, FFR can be applied to a sectorized cellular system as shown in FIG. 10. A sectorized cellular system is one in which each cell is divided into multiple sectors by using directional antennas. In the illustrated example, each cell is divided into an inner sector and three outer sectors Sector 1, Sector 2, and Sector 3. The frequency spectrum is divided in the same way as in FIG. 9, i.e., into frequency bands/subbands $f_A$, $f_{B1}$, $f_{B2}$, and $f_{B3}$. As shown in FIG. 10, each cell uses the inner frequency band $f_A$ for its inner sector, and uses the three frequency subbands $f_{B1}$, $f_{B2}$, and $f_{B3}$ for its three outer sectors, respectively. The correspondence between the three subbands and the three sectors 1, 2, 3 is identical among all cells. As a result, in an area where three sectors from three different cells adjoin each other (e.g., Sector 3 of Cell 0, Sector 2 of Cell 6 and Sector 1 of Cell 5), the frequency subbands used by the three sectors are all different, which reduces inter-cell interference. In such an FFR scheme, each cell can transmit using the entire frequency spectrum.

FIGS. 9 and 10 are adopted from Farooq Khan, "LTE for 4G mobile broadband: air interface technologies and performance," Cambridge University Press 2009, pp. 419-420.

SUMMARY OF THE INVENTION

While both FFR and inter-BS coordination (network MIMO) have been proposed as techniques for inter-cell interference cancellation in next generation wireless broadband systems (WiMAX and LTE-A), embodiments of the present invention provide a novel method that combines network MIMO and FFR to mitigate inter-cell interference.

Additionally, embodiments of the present invention utilize multi-cell system support self-organization to improve system performance. Self-organizing network (SON) functions are implemented in BSs to automate the configuration of BS parameters and to optimize network performance.

An object of the present invention is to provide a SON and FFR-based network MIMO transmission architecture in multi-cell wireless OFDM systems.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a cellular network comprising: a plurality of base stations each corresponding to a cell, each base station employing three directional antennas transmitting in three different directions using three different frequency bands, respectively, the three frequency bands used by the antennas of all base stations being the same three frequency bands; and at least one server connected to the plurality of base stations, wherein the server controls at least one group of three neighboring base stations among the plurality of base stations to coordinate their transmission within at least one of the three frequency bands in at least some time slots. Various frequency partition schemes may be used for grouping the frequency bands of the neighboring cells. Each base station may further employ one omni-directional antenna transmitting in an inner region of the corresponding cell using a fourth frequency band, wherein the omni-directional antennas of the plurality of base stations transmit without coordination with each other.

In another aspect, the present invention provides a method implemented in a wireless OFDM network, the wireless OFDM network comprising a plurality of base stations each transmitting in a plurality of radio resource regions and at least one server connected to the plurality of base stations, the method comprising: the server defining a plurality of coordinated groups each comprising a plurality of base stations for coordinated MIMO (multiple-input multiple-output) signal transmission; the base stations within each coordinated group negotiating one or more common radio resource region for use in the coordinated MIMO signal transmission; and each base stations within each coordinated group selecting zero or one serving mobile stations for each common radio resource region to be served by the coordinated MIMO signal transmission.

The method may further include: within each coordinated group, the base stations and/or the selected serving mobile stations estimating channel response information for channels between the base stations and the serving mobile stations, and the base stations forwarding the channel response information to the server; for each coordinated group, the server calculating, based on the channel response information received from the base stations, a weighting vector to be applied to signals transmitted by each base station in the coordinated group over each common radio resource region; and the server synchronizing data content of the signals transmitted by each base station over each common radio resource region to each selected serving mobile station.

In yet another aspect, the present invention provides a method implemented in a base station in a wireless OFDM network, the wireless OFDM network comprising a plurality of base stations each transmitting in a plurality of radio resource regions and at least one server connected to the plurality of base stations, the method comprising: receiving a signal from the server indicating a plurality of other base stations as forming a coordinated group with the base station for coordinated MIMO (multiple-input multiple-output) signal transmission; negotiating with the other base stations of the coordinated group to select one or more common radio resource region for use in coordinated MIMO signal transmission; and selecting zero or one serving mobile station for each common radio resource region to be served by the coordinated MIMO signal transmission.

The method may further include: estimating channel response information for a channel between the base station and the selected mobile station, and forwarding the channel response information to the server; performing signal preprocessing for coordinated MIMO transmission to transmit signals in the negotiated common radio resource region; monitoring a received signal quality of the transmission; and repeating the estimating and forwarding step based on a result of the monitoring.

It is to be understood that both the foregoing general description and the following detailed description are exemplary and explanatory and are intended to provide further explanation of the invention as claimed.

BRIEF DESCRIPTION OF THE DRAWINGS

FIGS. 2A-2C schematically illustrate coordinated cell grouping which implements three-cell FFR-based network MIMO for a sectorized cellular system according to embodiments of the present invention. FIG. 2A illustrates an example of cell grouping and fractional frequency reuse using a regular frequency partition. FIG. 2B illustrates an example of cell grouping and fractional frequency reuse using a rearranged frequency partition. FIG. 2C illustrates the frequency bands and subbands used in the FFR scheme of FIGS. 2A and 2B.

DETAILED DESCRIPTION OF THE PREFERRED EMBODIMENTS

Embodiments of the present invention provide a FFR-based network MIMO transmission method in a cellular system that employs cell sectoring using directional antennas. In preferred embodiments, the number of cells in a coordinated network MIMO group is three. Further, embodiments of the present invention provide a practical implementation of SON-based three-cell FFR-based network MIMO for a wireless OFDM (orthogonal frequency-division multiplexing) system.

In the embodiments described below, Co-MIMO or CoMP-JP transmission are used as the downlink multi-BS joint MIMO processing (network MIMO) mode, but the invention is not limited to such modes.

Figure 1:
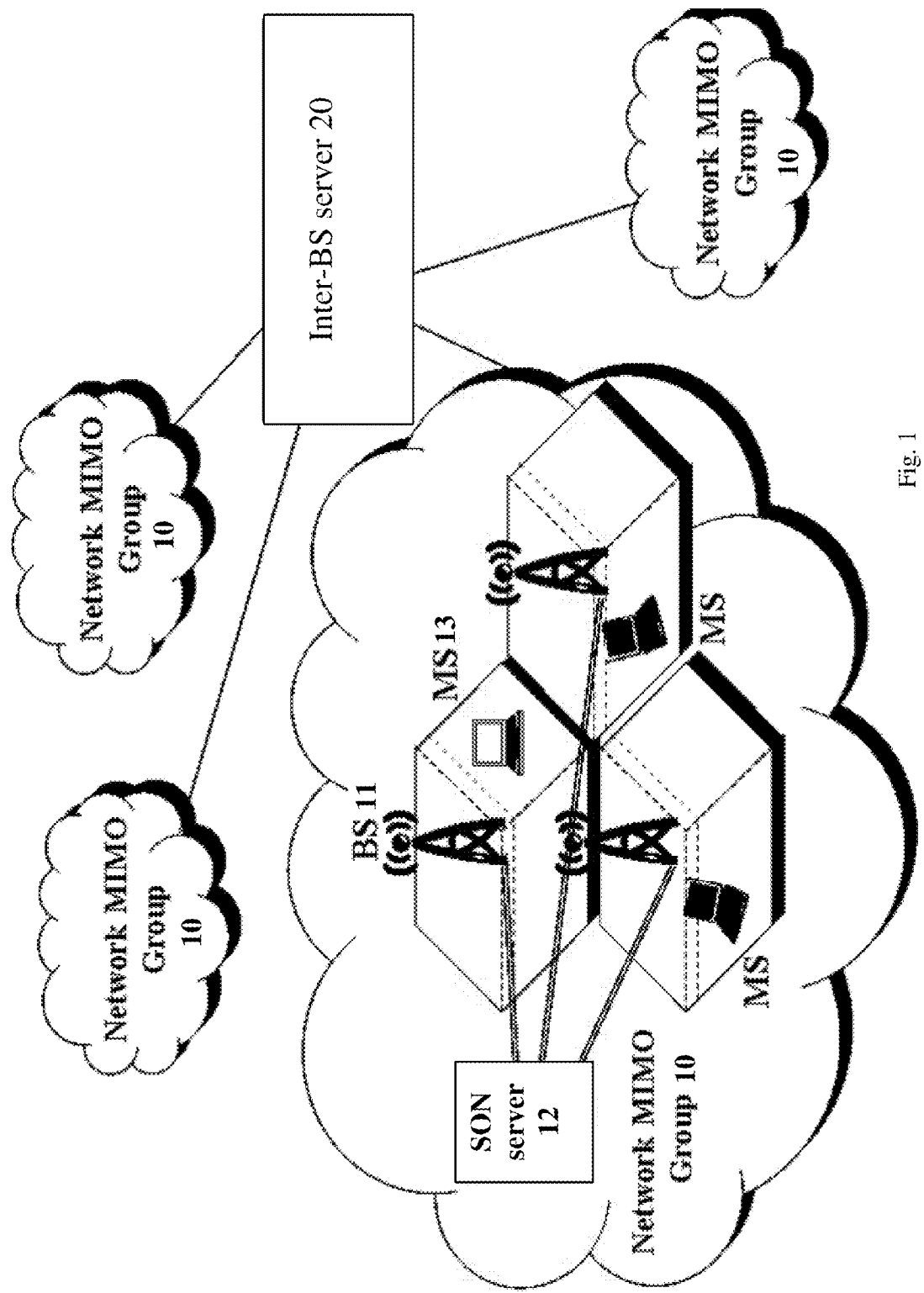
FIG. 1 illustrates a self-organizing based network MIMO cellular network according to an embodiment of the present invention.

FIG. 1 schematically illustrates a self-organizing FFR-based network MIMO cellular network according to an embodiment of the present invention. In this network, multiple cells form coordinated groups (referred to as network MIMO groups), where the cells within each group cooperate with each other via a server (referred to as a SON server). A number of network MIMO groups are shown in FIG. 1, one of them being illustrated in more detail.

As shown in FIG. 1, a network MIMO group 10 includes multiple (three in this example) base stations (BS) 11 communicating with a number of mobile stations (MS) 13. Each BS includes three directional antennas transmitting in three different directions using three respective frequency bands and one omni-directional antenna transmitting in a fourth frequency band for the inner cell regions, as will be described in more detail later. The BSs 11 are connected to the SON server 12, which collects reported SON measurements from the BSs and MSs to organize the scheduling or resource allocation processing for the group. Typically, the reported SON measurements from the BS and MS include: signal quality of the serving BS (i.e. the BS that serves the particular MS) and neighbor BSs, interference level from the neighbor BSs, cell information of neighbor BSs, load information of neighbor BSs, MS location distribution, MS uplink (UL)/downlink (DL) signal-to-interference plus noise ratio (SINR) distribution, etc. Note that a SON server 12 may serve two or more network MIMO groups. The multi-cell network is made up of the multiple network MIMO groups 10 which perform inter-BS communication through another server 20, referred to as the inter-BS server. Each of the SON servers 12 and the inter-BS server 20 is a computer having a CPU and memories that store program instructions executed by the CPU.

Figure 11B:
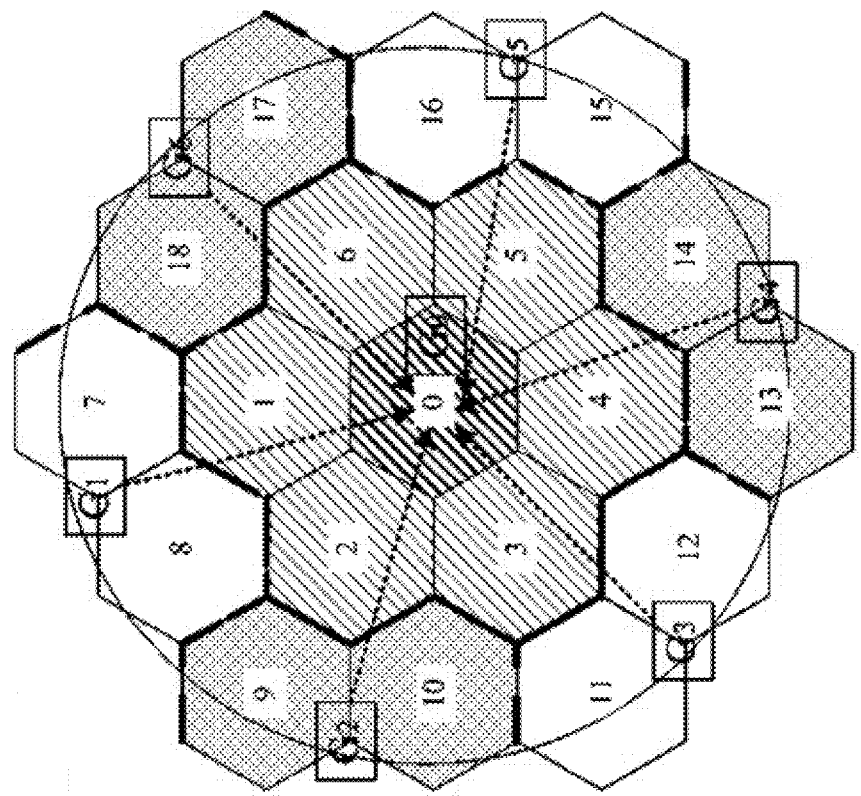
FIGS. 11A and 11B illustrate two examples of inter-group interference for a three-cell and a seven-cell network MIMO system, respectively, without frequency partition.
Figure 11A:
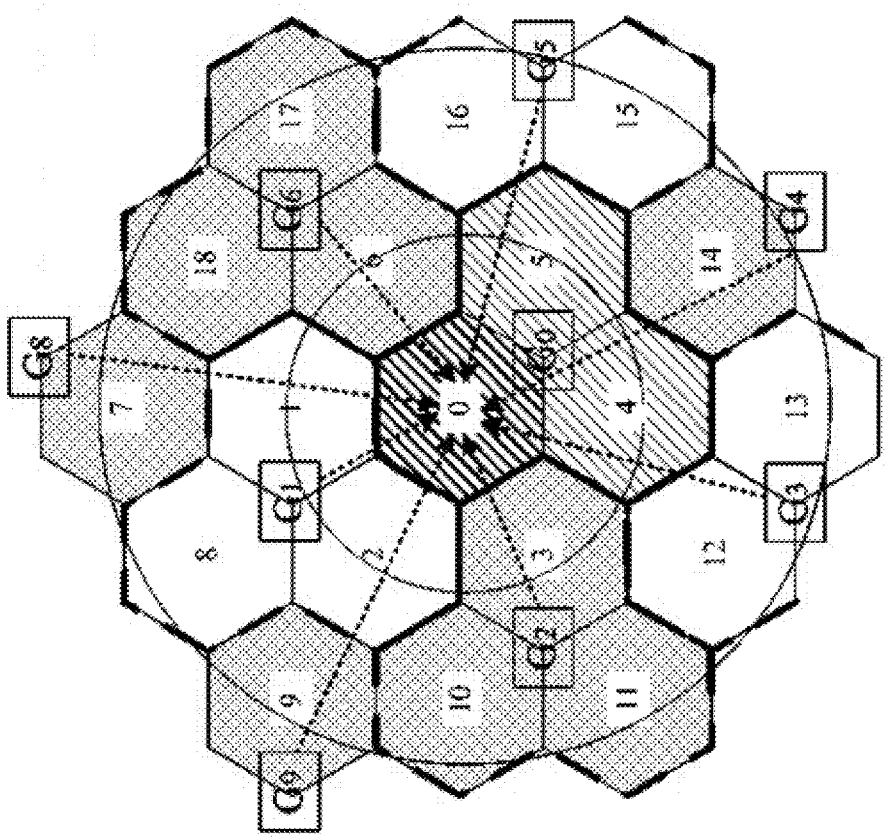

Before describing the embodiments in detail, an illustration of inter-group interference (IGI) effect in a conventional network MIMO system using omni-directional antenna is presented. FIGS. 11A and 11B show the effect of IGI in two examples for an omni-directional antenna-based multi-cell system with three-cell and seven-cell network MIMO transmission, respectively. Three-cell coordination and seven-cell coordination have relatively small coordinated values for constructing the network MIMO transmissions and require less computational resource to implement. FIG. 11A and FIG. 11B each illustrate a portion of a multi-cell system with two-tier surrounding cells around a cell (Cell 0). The first tier surrounding cells are labeled 1 through 6 and the second tier surrounding cells are labeled 7 through 18. Assume that all cells use the same frequency spectrum or under certain frequency resource unit.

FIG. 11A shows a three-cell coordinated group layout, where Cell 0 forms a three-cell coordinated group $G_0$ with Cells 4 and 5. Within the coordinated group (network MIMO group), the intra-group interferences come from Cells 4 and 5 on Cell 0 are eliminated via multi-BS joint MIMO processing transmission. In other words, a MS will not experience interference from other cells in the same coordinated group as the serving cell. However, the remaining surrounding cells still cause interference to Cell 0, referred to as inter-group interference. In this case, the interferers come from the other coordinated network MIMO groups $G_1$ to $G_8$ where the corresponding cells involved in each group are: $G_1=\{1, 2, 8\}$, $G_2=\{3, 10, 11\}$, $G_3=\{12, 13, \ldots\}$, $G_4=\{14, \ldots\}$, $G_5=\{15, 16\}$, $G_6=\{6, 17, 18\}$, $G_7=\{7, \ldots\}$, and $G_8=\{9, \ldots\}$. It can be seen that there still exist four first-tier interferers (Cells 1, 2, 3, 6 located on the smaller circle in FIG. 11A) and all second-tier interferers (Cells 7 through 18 located on the larger circle).

Similarly, with the seven-cell coordinated group layout shown in FIG. 11B, the coordinated partners of Cell 0 are Cells 1 through 6, i.e., Cells 0 through 6 form a coordinated group $G_0$. Under this layout, all second second-tier cells still contribute to inter-group interference even though the interferences from first-tier surrounding Cells 1 through 6 are eliminated via multi-BS joint MIMO processing transmission. In FIGS. 11A and 11B, each dotted line with arrow represents interference from a neighboring coordinated group on Cell 0.

A comparison of FIGS. 11A and 11B shows that in a network MIMO system with omni-directional antennas, a larger size of the coordinated group (e.g. seven) can reduce interference more effectively than a smaller group size (e.g. three). However, when the size of the coordinated group is larger than three cells, unfair and unbalanced signal quality among the cells within the coordinated group becomes an issue. In such a larger group, cells in the edge of coordinated group will have poorer SINR than cells in the center of the coordinated group. For example, in seven-cell coordinated group layout shown in FIG. 11B, Cell 0 will have better signal quality than Cells 1 through 6 which are located on the edge.

To reduce inter-group interference, embodiments of the present invention provide a FFR-based network MIMO system, which employs cell sectoring using directional antennas. In this system, the group size for coordinated groups is three cells. Such a system is less computationally complex than seven-cell or larger groups, and also provides balanced signal quality among the coordinated cells of a group.

FIGS. 2A-2C schematically illustrate coordinated cell grouping which implements three-cell FFR-based network MIMO for a sectorized cellular system according to embodiments of the present invention. In these examples, the cells of the cellular system are shown as having a hexagonal shape (sometimes also referred to as diamond-shaped cells); this shape is for purposes of schematic illustration; the actual cells may have other shapes, or the different cells may have different sizes and shapes. The invention is not limited to the particular cell shape illustrated here.

In the examples shown in FIGS. 2A and 2B, seven cells are labeled 0 to 7, respectively. Each cell is sectorized into four sectors, including an inner sector and three outer sectors. The inner sector (represented by a circle in the figures) is generally circular shaped and located at the center of the cell. The three outer sectors divide the reset of the cell area approximately evenly in the angular direction; in the illustrated examples, the three outer sectors are centered at the 3-o'clock, 7-o'clock and 11-o'clock positions, respectively. Cell sectoring is accomplished by using directional antennas. Thus, the BS for each cell has three directional antennas and one omni-directional antenna as mentioned before, each antenna corresponding to one of the sectors of the cell.

Figure 10:
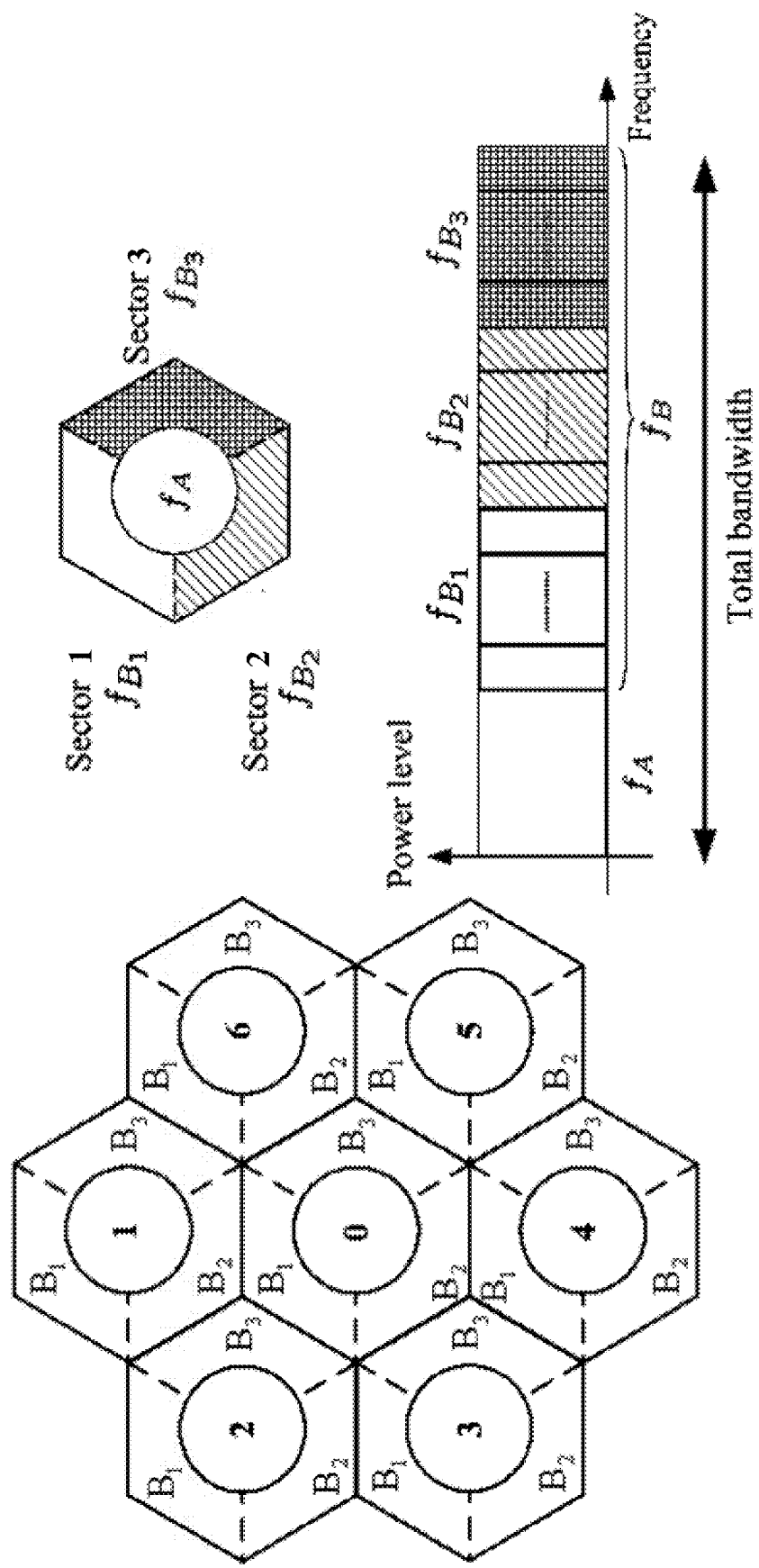
FIG. 10 illustrates an example of conventional FFR in a sectorized cellular system.

FIG. 2C illustrates the frequency bands and subbands used in the FFR scheme of FIGS. 2A and 2B. Similar to the conventional FFR scheme shown in FIG. 10, the entire useable frequency range is divided into frequency bands and subbands $f_A$, $f_{B1}$, $f_{B2}$, and $f_{B3}$. FIG. 2C shows the three subbands $f_{B1}$, $f_{B2}$, and $f_{B3}$ as being equally wide and each containing N frequency resource units (RU). The frequency band $f_A$ is used for the inner sector of each cell; in this band, each cell executes resource allocation and scheduling individually, i.e., without multi-cell coordination. The subbands $f_{B1}, f_{B2}, f_{B3}$ are used for the outer sectors in the manners described below.

FIG. 2A schematically illustrates a first exemplary FFR-based network MIMO architecture with three-cell coordination according to an embodiment of the present invention. In this architecture, the outer sectors of the same orientation in all cells use the same frequency subband. In the example of FIG. 2A, the 11-o'clock outer sectors of all cells use subband $f_{B1}$, the 7-o'clock outer sectors of all cells use subband $f_{B2}$, and the 3-o'clock outer sectors of all cells use subband $f_{B3}$. Such a frequency partition is referred to in this disclosure as a regular frequency partition.

A plurality of coordinated groups (network MIMO groups) are formed, each group being formed by the three outer sectors of the same orientation belonging to three neighboring cells. In the example of FIG. 2A, the 11-o'clock sectors of Cells 0, 4 and 5 form a coordinated group for frequency subband $f_{B1}$; the 7-o'clock sectors of Cells 0, 4 and 5 form a coordinated group for frequency subband $f_{B2}$; and the 3-o'clock sectors of Cells 0, 4 and 5 form a coordinated group for frequency subband $f_{B3}$. Cell 0 does not form any coordinated groups with Cells 1, 2, 3 or 6. The cells involved in each coordinated group coordinate their signal transmission in that frequency subband (and in each RU) using joint MIMO processing.

In other words, network MIMO transmission is applied to each subband $f_{Bi,n}$ for i=1, 2, 3 and n=1, . . . , N. Using the matrix notation of Karakayali et al. 2006 (see p. 57), for the 3-cell coordination shown in FIG. 2A, the channel matrix for the RU $f_{B1,n}$ is $$H(f_{B1,n}) = \begin{bmatrix} h_{1,1} & h_{1,2} & h_{1,3} \\ 0 & h_{2,2} & 0 \\ 0 & 0 & h_{3,3} \end{bmatrix}$$

The interference caused by $h_{1,2}$ and $h_{1,3}$ (comes from cells 4 and 5) is eliminated by network MIMO. It should be noted that the above channel matrix assumes perfect cell sectorization by the directional antenna. In practice, actual cell sectorization using directional antennas is likely not perfect due to side-lobes of the gain patterns of the antennas. Thus, those skilled in the relevant art will recognize that the matrix model may be modified accordingly; for example, the elements that are shown as zero in the above matrix may have small non-zero values. The implementation details of network MIMO are generally known in the art and can be found in the literature including the above reference.

In FIG. 2A, the notations $Cell_a^{Gi}$, $Cell_b^{Gi}$ and $Cell_c^{Gi}$ denote the three cells in an arbitrary coordinated group denoted $G_i$ such as Cells 0, 4 and 5 in the group illustrated in the figure.

FIG. 2B schematically illustrates a second exemplary FFR-based network MIMO architecture with three-cell coordination according to another embodiment of the present invention. In this architecture, the outer sectors of the same orientation in all cells do not use the same frequency subband. Rather, the three frequency subbands $f_{B1}, f_{B2}$ and $f_{B3}$ are used for the outer sectors in a rearranged manner, so that for any group of three neighboring cells, the orientations of the three subbands are different in all three of the cells, and further, for each hexagonal area formed by three adjoining outer sectors of three neighboring cells, the same frequency subband is used in these three outer sectors. Such a frequency partition is referred to in this disclosure as a rearranged frequency partition. In the example shown in FIG. 2B, for Cell 0, the 11-o'clock sector uses subband $f_{B1}$, the 7-o'clock sector uses subband $f_{B2}$; and the 3-o'clock sector uses subband $f_{B3}$. The frequency subbands correspond to the 11-o'clock, 7-o'clock and 3-o'clock outer sectors of the other cells are as follows, respectively: Cell 1: $f_{B3}, f_{B1}$, and $f_{B2}$; Cell 2: $f_{B2}, f_{B3}$, and $f_{B1}$; Cell 3 and Cell 5: same as Cell 1; Cell 4 and Cell 6: same as Cell 2.

Using this rearranged frequency partition, a plurality of coordinated groups are formed, each group being formed by three outer sectors belonging to three neighboring cells. In the example of FIG. 2B, the 11-o'clock sector of Cell 0, the 7-o'clock sector of Cell 1, and the 3-o'clock sector of Cell 2 form a coordinated group for frequency subband $f_{B1}$; the 7-o'clock sector of Cell 0, the 3-o'clock sector of Cell 3, and the 11-o'clock sector of Cell 4 form a coordinated group for frequency subband $f_{B2}$; and the 3-o'clock sector of Cell 0, the 11-o'clock sector of Cell 5, and the 7-o'clock sector of Cell 6 form a coordinated group for frequency subband $f_{B3}$. These are schematically indicated in FIG. 2B by the three hexagonal shaped areas outlined by thick dashed lines. The cells involved in each coordinated group coordinate their signal transmission in that frequency subband using joint MIMO processing.

More generally, under an FFR-based network MIMO architecture (either the regular frequency partition or the rearranged frequency partition), a coordinated group (a network MIMO group) is a logical region which includes multiple outer sectors of neighboring cells, where the cells perform joint MIMO processing (coordinated multi-cell transmission). Under both regular frequency partition or the rearranged frequency partition (FIG. 2A and FIG. 2B, respectively), each cell participates in three coordinated groups for the three frequency subbands, respectively. Under regular frequency partition (FIG. 2A), Cell 0 participates in coordinated groups with Cells 4 and 5 for all three frequency subbands, while under rearranged frequency partition (FIG. 2B), Cell 0 participates in coordinated groups with different pairs of other cells for the three frequency subbands.

Figure 3B:
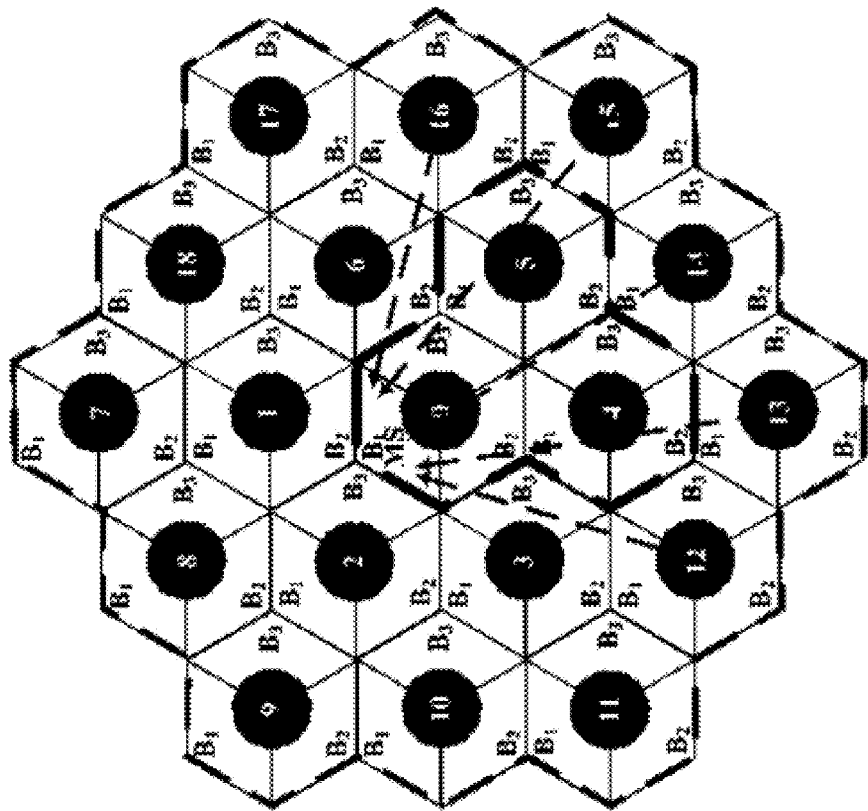
FIGS. 3A and 3B illustrate the effect of interference reduction under 3-cell FFR-based network MIMO with regular frequency partition.
Figure 3A:
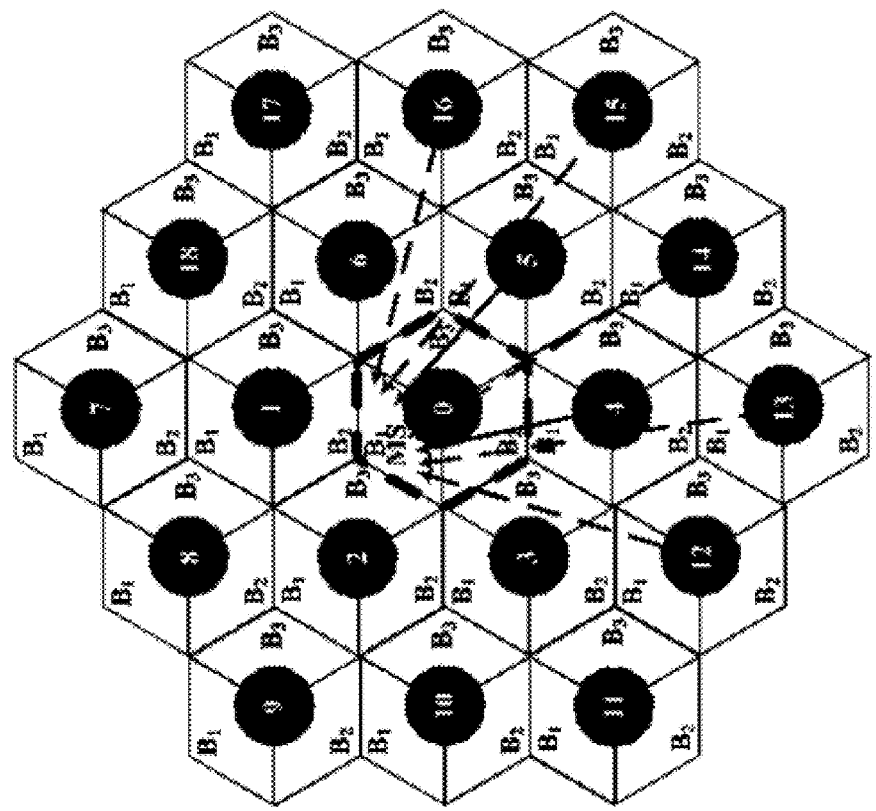

FIGS. 3A and 3B schematically illustrate the effect of interference reduction on Cell 0 under 3-cell FFR-based network MIMO with regular frequency partition. Each of FIGS. 3A and 3B illustrate a portion of a cellular network containing Cells 0 through 18, and the cells are frequency-partitioned in the manner shown in FIG. 2A (regular frequency partition). FIG. 3A illustrates a comparison case where no multi-cell joint MIMO processing is applied, and FIG. 3B illustrates the case where Cells 0, 4 and 5 form a coordinated group for multi-cell joint MIMO processing in three frequency subbands.

When no multi-cell joint MIMO processing is applied (FIG. 3A), the 11-o'clock outer sector of Cell 0 (frequency subband $f_{B1}$) experiences interference from the 11-o'clock outer sectors of Cells 4, 5 (first tier neighbors) and Cells 12, 13, 14, 15, 16 (second tier neighbors), as indicated by the dashed lines with arrows. Note that under the assumption of perfect sectoring by directional antenna (the effect of side lobes is not illustrated in FIGS. 3A and 3B), the 11-o'clock outer sectors of Cells 1, 2, 3, 6 and Cells 7-11, 17 and 18 are not interference sources because their antennas that transmit in the subband $f_{B1}$ are not oriented toward the 11-o'clock outer sector of Cell 0. When Cells 0, 4 and 5 form a coordinated group for multi-cell joint MIMO processing (FIG. 3B), interference from Cells 4 and 5 are eliminated, and only second-tier neighboring Cells 12, 13, 14, 15, 16 remain interferers. Thus, as compared to conventional FFR techniques, applying network MIMO in a FFR-based cellular network reduces interferences and improves signal quality.

It should be noted that in FFR-based network MIMO architecture, all cells in the cellular system participate in network MIMO groups. For example, although not indicated in FIG. 3B, some of the other groups among the 19 cells include groups form by Cells {8, 2, 1}, {10, 11, 3}, and {18, 6, 17}. As will be described later, different coordinated groups may be formed in a time-division or frequency-division manner.

An issue under 3-cell FFR-based network MIMO with regular frequency partition (FIG. 2A) is service fairness. Service fairness refers to the inconsistency of signal quality experienced by MSs located in different parts of a cell or different cells or parts within a cell group. For example, in this case, the signal quality is different in different outer sectors of a cell. As shown in FIG. 3B, for the 11-o'clock outer sector (subband $f_B i$) of Cell 0, the interference from Cells 4 and 5 are eliminated by coordinated multi-cell transmission, and this outer sector only experience interference from second-tier neighbors. However, for the 3-o'clock outer sector (subband $f_{B3}$) of Cell 0, interference from first-tier neighbors Cell 2 and Cell 3 (not within the same coordinated group as Cell 0) are present; and for the 7-o'clock outer sector (subband $f_{B2}$) of Cell 0, interference from first-tier neighbors Cell 1 and Cell 6 (not within the same coordinated group as Cell 0) are present. Thus, these latter two outer sectors of Cell 0 experience interference from two first-tier neighbors as well as second-tier neighbors. As a result, within Cell 0, different outer sectors experience different signal quality.

Likewise, for the 11-o'clock outer sector (subband $f_{B1}$) of Cell 4, the interference from Cells 13 and 14 is present; and for the 11-o'clock outer sector (subband $f_{B1}$) of Cell 5, the interference from Cells 14 and 15 is present. The overall result is, within the coordinated group formed by Cells 1, 4 and 5, MSs located in the 11-o'clock outer sector of Cell 0 (subband $f_{B1}$), the 7-o'clock outer sector of Cell 4 (subband $f_{B2}$), and the 3-o'clock outer sector of Cell 5 (subband $f_{B3}$) experience higher signal quality than those in the other outer sectors within the same coordinated group. Using the notations $Cell_a^{Gi}$, $Cell_b^{Gi}$ and $Cell_c^{Gi}$ as in FIG. 2A, the frequency subband $f_{B1}$ may be referred to as the primary band of $Cell_a^{Gi}$ for arbitrary group $G_i$. Similarly, $f_{B2}$ and $f_{B3}$ may be referred to as the primary bands of $Cell_b^{Gi}$, and $Cell_c^{Gi}$, respectively.

Figure 4C:
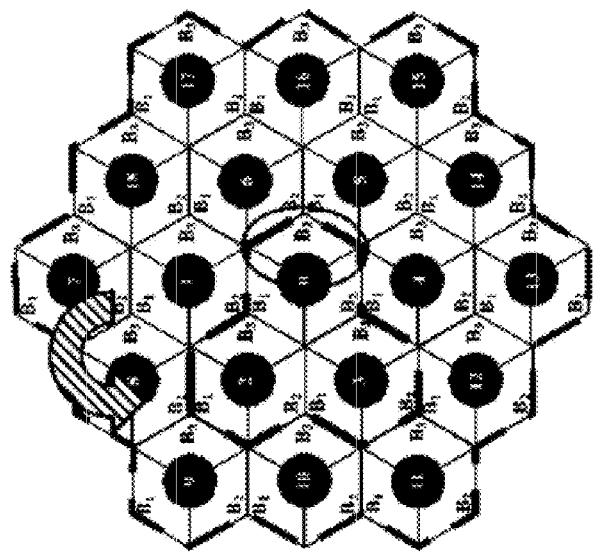
FIGS. 4A-4C illustrate cell regrouping and partner selection for 3-cell FFR-based network MIMO with regular frequency partition according to an embodiment of the present invention.
Figure 4B:
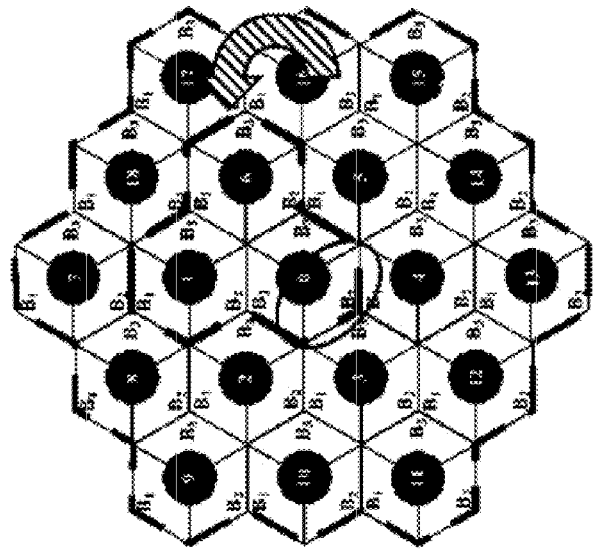
Figure 4A:
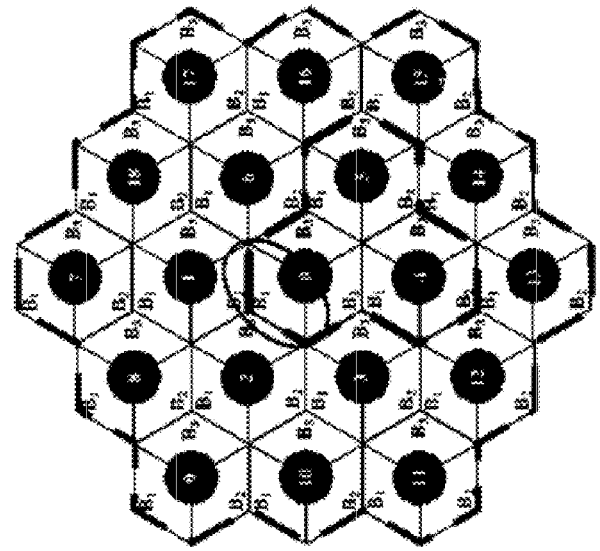

To address the service fairness issue for a FFR-based network MIMO system with regular frequency partition, a cells regrouping and partner selection method according to an embodiment of the present invention may be implemented, as illustrated in FIG. 4A-4C. In FIGS. 4A-4C, the cells 0 through 18 are numbered the same was as in FIG. 3B, and the cells are frequency-partitioned in the manner shown in FIG. 2A (regular frequency partition). According to the regrouping and partner selection method, in different time slots during transmission, different coordinated groups are formed to perform network MIMO transmission.

FIGS. 4A-4C illustrate the cell grouping for three consecutive time slots. In the first time slot (FIG. 4A), Cell 0 is grouped with Cells 4 and 5 with the primary band being $f_{B1}$ (as indicated by the oval in the figure). In the second time slot (FIG. 4B), Cell 0 regroups with Cells 1 and 6 to form a network MIMO group (i.e., Cell 0 is no longer grouped with Cells 4 and 5). Under this regrouping, the primary band of Cell 0 becomes $f_{B2}$, as indicated by the oval in FIG. 4B. In the third time slot (FIG. 4C), Cell 0 regroups with Cells 2 and 3 to form a network MIMO group, and the primary band of Cell 0 now becomes $f_{B3}$ as indicated by the oval in FIG. 4C.

Such selection of partner for the coordinated groups in consecutive time slots can be viewed as a 120-degree "rotation" as indicated by the arrows in FIGS. 4B and 4C. Here, the term "rotation" is used as shorthand for the coordinated partner reselection procedure. The rotation is counterclockwise in this example, but it may alternatively be clockwise. Although only the regroupings for Cell 0 are indicated in FIGS. 4A-4C, the groupings for all cells are "rotated" simultaneously. For example, in the second time slot, Cell 4 is grouped with Cells 3 and 12, and Cell 5 is grouped with Cells 14 and 15; in the third time slot, Cell 4 is grouped with Cells 13 and 14, and Cell 5 is grouped with Cells 16 and 6 (these groupings are not shown in FIG. 4B).

Using this rotation method, each cell has an opportunity to cooperate with all six neighboring cells sequentially, and each outer sector (subband) has an opportunity to become the primary band. Such a regrouping and partner selection method may be considered a TDMA (time division multiple access)-based method.

As an alternative to the TDMA-based regrouping described above, regrouping may be done by dividing each frequency subband into smaller slices, and grouping the cells in different ways (the three ways shown in FIGS. 4A-4C) for different frequency slices. This may be considered a FDMA (frequency division multiple access)-based method.

Figure 5:
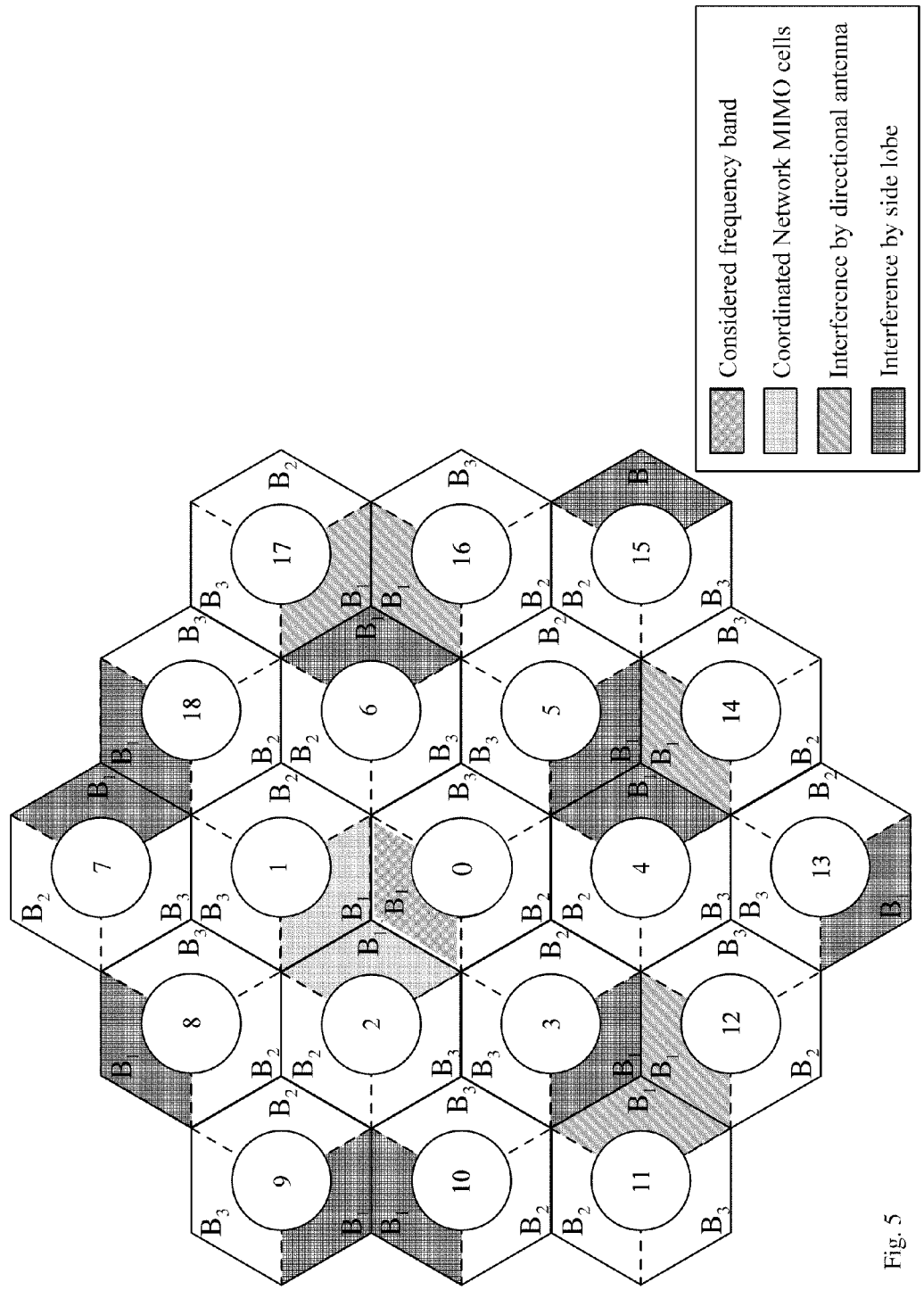
FIG. 5 illustrates the interference effect in a three-cell FFR-based network MIMO with rearranged frequency partition.

More advantageous interference cancellation can be achieved by using three-cell FFR-based network MIMO with rearranged frequency partition, i.e., the FFR scheme shown in FIG. 2B. A portion of a cellular network containing Cells 0 through 18 is illustrated in FIG. 5, where the cells are frequency-partitioned in the manner shown in FIG. 2B (rearranged frequency partition). Under this rearranged frequency partition, each cell coordinates with six neighboring cells to form three individual network MIMO groups for the three respective frequency subbands $f_{B1}$, $f_{B2}$, and $f_{B3}$. For example (see also FIG. 2B), Cell 0 coordinates with Cells 1 and 2 for subband $f_{B1}$, with Cells 3 and 4 for subband $f_{B2}$, and with Cells 5 and 6 for subband $f_{B1}$. In other words, three-cell network MIMO transmission is performed in each subband (i.e. each frequency partition).

FIG. 5 illustrates the interference effect for a MS using a RU within frequency subband $f_{B1}$ of Cell 0 (i.e. MS located in the 11-o'clock outer sector). Using the network MIMO groups described above, the interference from Cells 1 and 2 for this RU is eliminated because these cells coordinate with Cell 0 in subband $f_{B1}$. Under the assumption of perfect 120 degree sectoring by directional antenna, the only interference sources for this RU are second tier neighboring Cells 11, 12, 14, 16, and 17 (interference by directional antenna).

Note that actual cell sectorization using directional antennas is likely not perfect. Thus, the other eleven cells, namely, Cells 3-10, 13, 15 and 18, will affect the received signal quality of the $f_{B1}$ sector of Cell 0 by the side lobe and back lobe transmissions of their $f_{B1}$ antennas, as illustrated in FIG. 5. However, the interference caused by side lobe and back lobe transmissions is much less significant.

As a comparison, in a conventional MIMO system that uses omni-directional antenna (FIG. 11A), the interference sources include four first-tier neighbors and all twelve second-tier neighbors.

Compared with network MIMO using regular frequency partition (FIG. 2A), network MIMO using rearranged frequency partition eliminates the service fairness issue. For example, for the 7-o'clock ($f_{B2}$) sector of Cell 0, the interference from Cells 3 and 4 are eliminated by network MIMO transmission, and only five interference sources (second tier neighboring Cells 15, 16, 18, 8 and 9 by directional antenna) remain, along with eleven cells that interfere by side lobe and back lobe transmissions. The same is true for the 3-o'clock ($f_{B3}$) sector of Cell 0. In other words, the three outer sectors of Cell 0 have the same signal quality. As a result, there is no need to perform the cell regrouping procedure shown in FIGS. 4A-4C, whereby reducing the complexity of system design.

Figure 6:
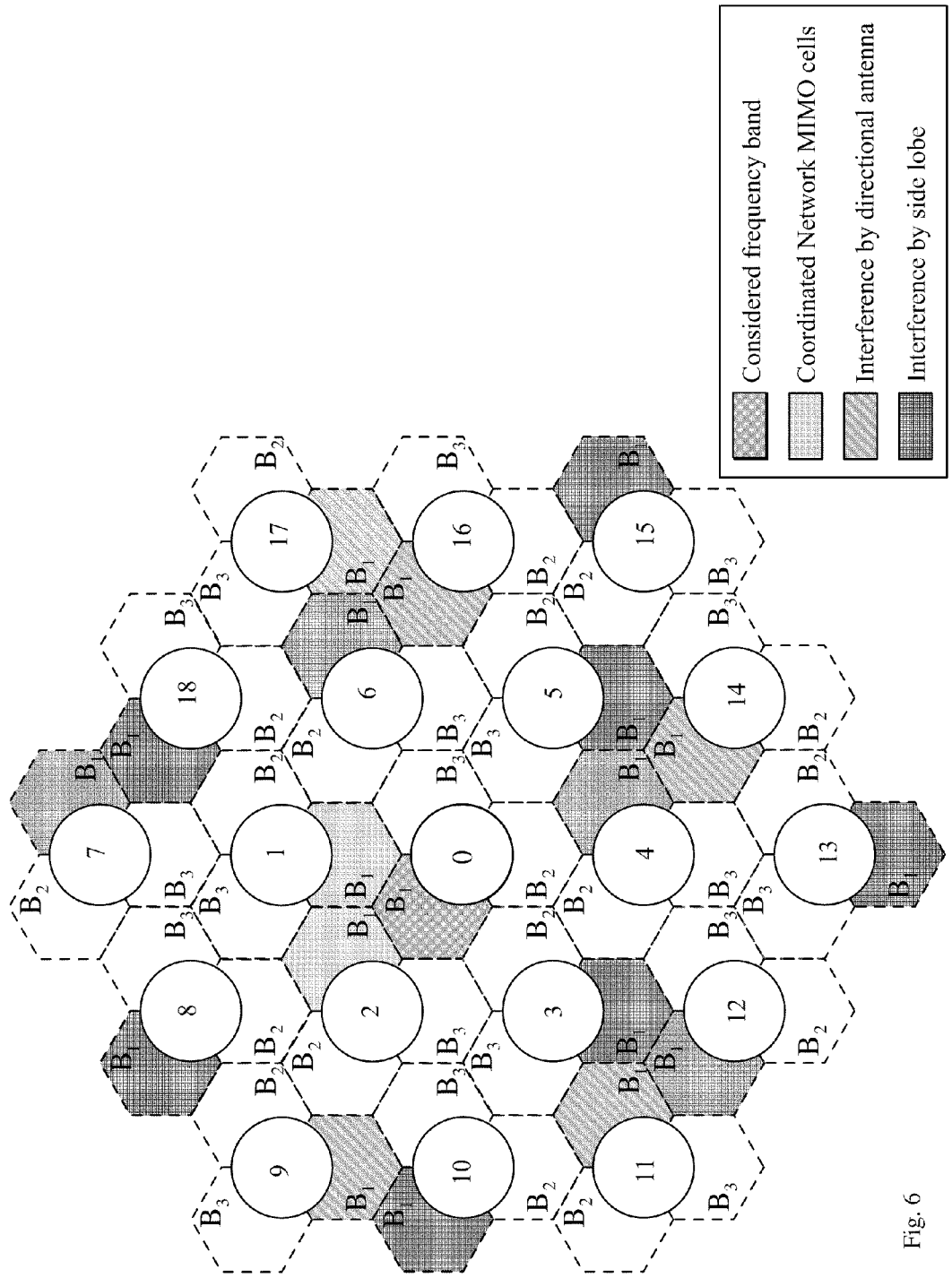
FIG. 6 illustrates the interference effect in a three-cell FFR-based network MIMO with rearranged frequency partition, in a system having clover-leaf-shaped cells.

The cell sectoring layout shown in FIGS. 2A-5 uses hexagonal shaped cells where each sector is a rhombus (referred to as 120-degree beam width sectors). Cell sectoring layout with clover-leaf-shaped cells and hexagonal sectors (referred to as 60-degree beam width sectors) can also be used, as shown in FIG. 6. Different antennas can be used to achieve these two different cell sectoring plans, as described in, for example, U.S. Pat. No. 6,002,935. FIG. 6 illustrates the interference effect for a MS in frequency subband $f_{B1}$ of Cell 0 in a similar manner as FIG. 5, showing interference caused by directional antenna and interference caused by side lobe and back lobe transmissions. The clover-leaf cell shape accomplishes similar results as the hexagonal cell shape. Other cell shape and sectoring layout may be used, and the invention is not limited to any particular cell shape or sectoring layout.

Figure 7:
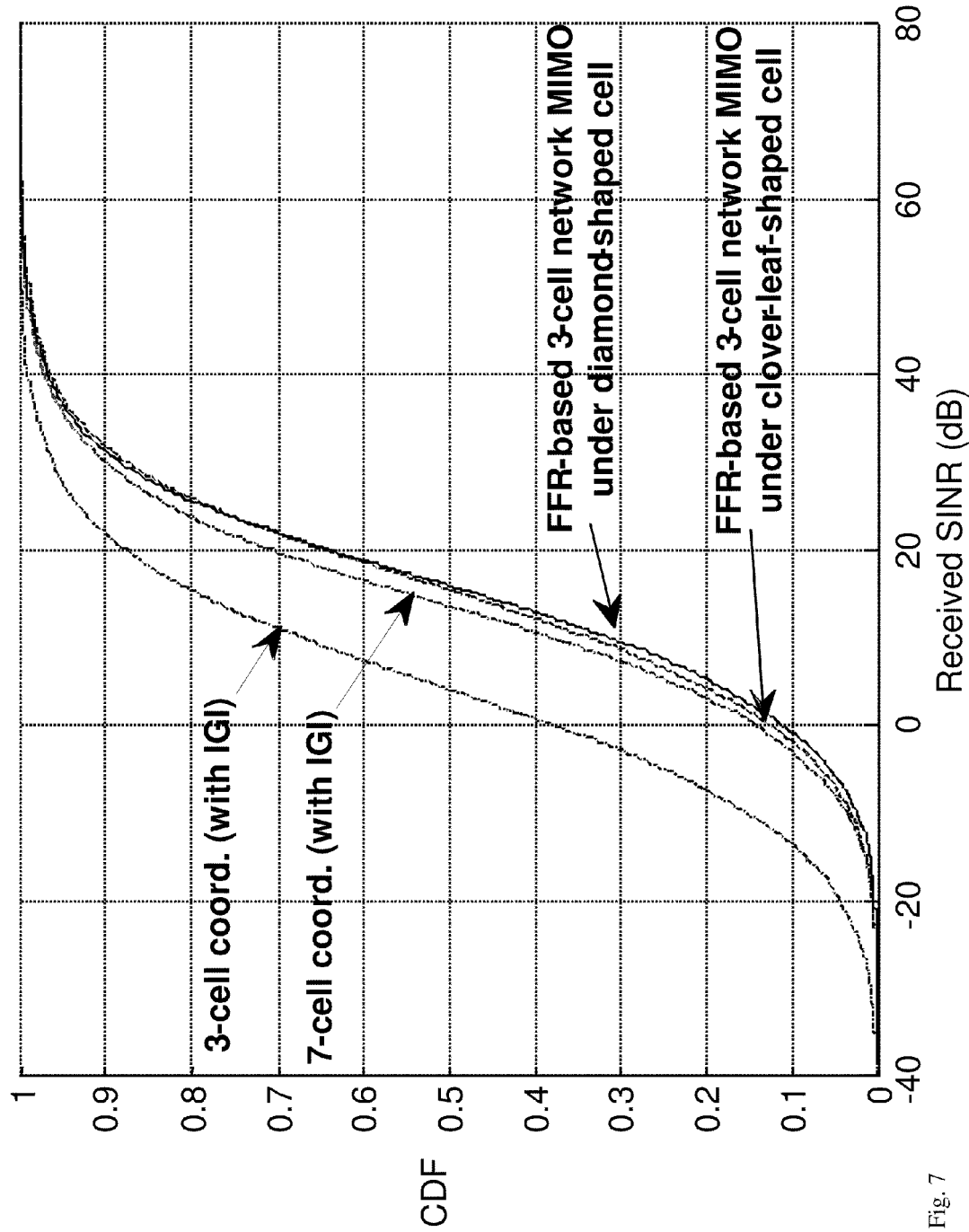
FIG. 7 illustrates a simulation result for three-cell FFR-based network MIMO system and comparison examples.

Simulation results for three-cell FFR-based network MIMO system are presented in FIG. 7, which shows the cumulative distributed function (CDF) of the received SINR of four different cellular architectures. The first curve from the left is the simulation result for 3-cell conventional network MIMO (without FFR); the second curve from the left is for 7-cell conventional network MIMO (without FFR); the third curve from the left is for 3-cell FFR-based network MIMO using clover-leaf-shaped cells; and the fourth curve from the left is for 3-cell FFR-based network MIMO using hexagonal-shaped cells. This graph shows that the result using FFR-based network MIMO according to embodiments of the present invention can achieve a result similar to 7-cell conventional network MIMO, but with reduced computational complexity.

Note that in the cell sectoring described above (e.g. FIGS. 2A, 2B and 3A-6), each cell is sectored into one inner sector and three outer sectors, and the entire frequency range is divided into four bands/subbands. Alternatively, the cells may be sectored into three sectors only, without the inner sector. This is true for both the hexagonal and clover-leaf shaped cells. The FFR-based network MIMO technique described above can be applied to such a cell sectoring as well, and those skilled in the art will easily make the necessary changes based on the descriptions in this disclosure.

The above description and illustrations refer to cell sectors, e.g., the orientation of a sector, a sector corresponding to a frequency subband, etc., for the purpose of schematically illustrating the principles of the embodiments of the invention. As stated earlier, cells and cell sectoring are physically implemented by base stations employing multiple antennas (directional and omni-direction). Each cell corresponds to a base station, and each cell sector corresponds to an antenna.

Figure 8:
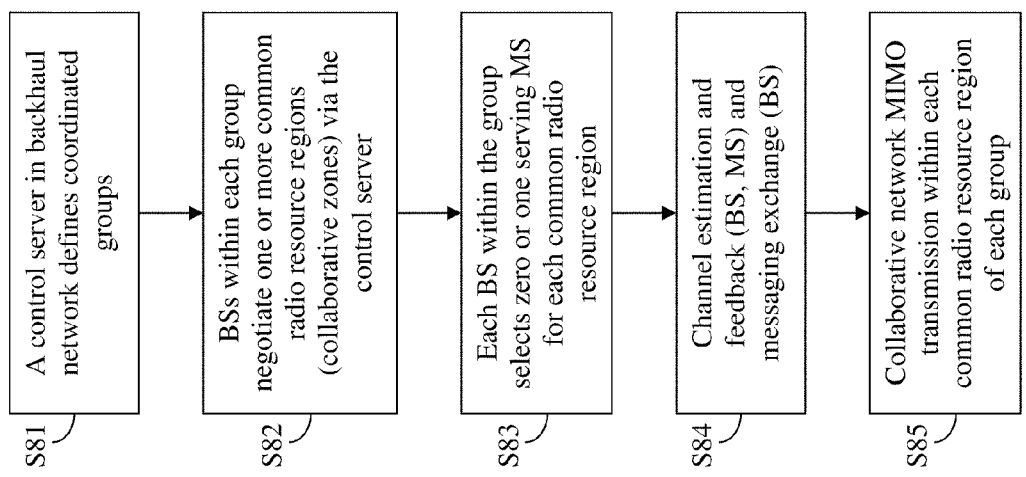
FIG. 8 is a flow chart showing a practical implementation method of three-cell FFR-based network MIMO for a wireless OFDM system according to an embodiment of the present invention.
Figure 9:
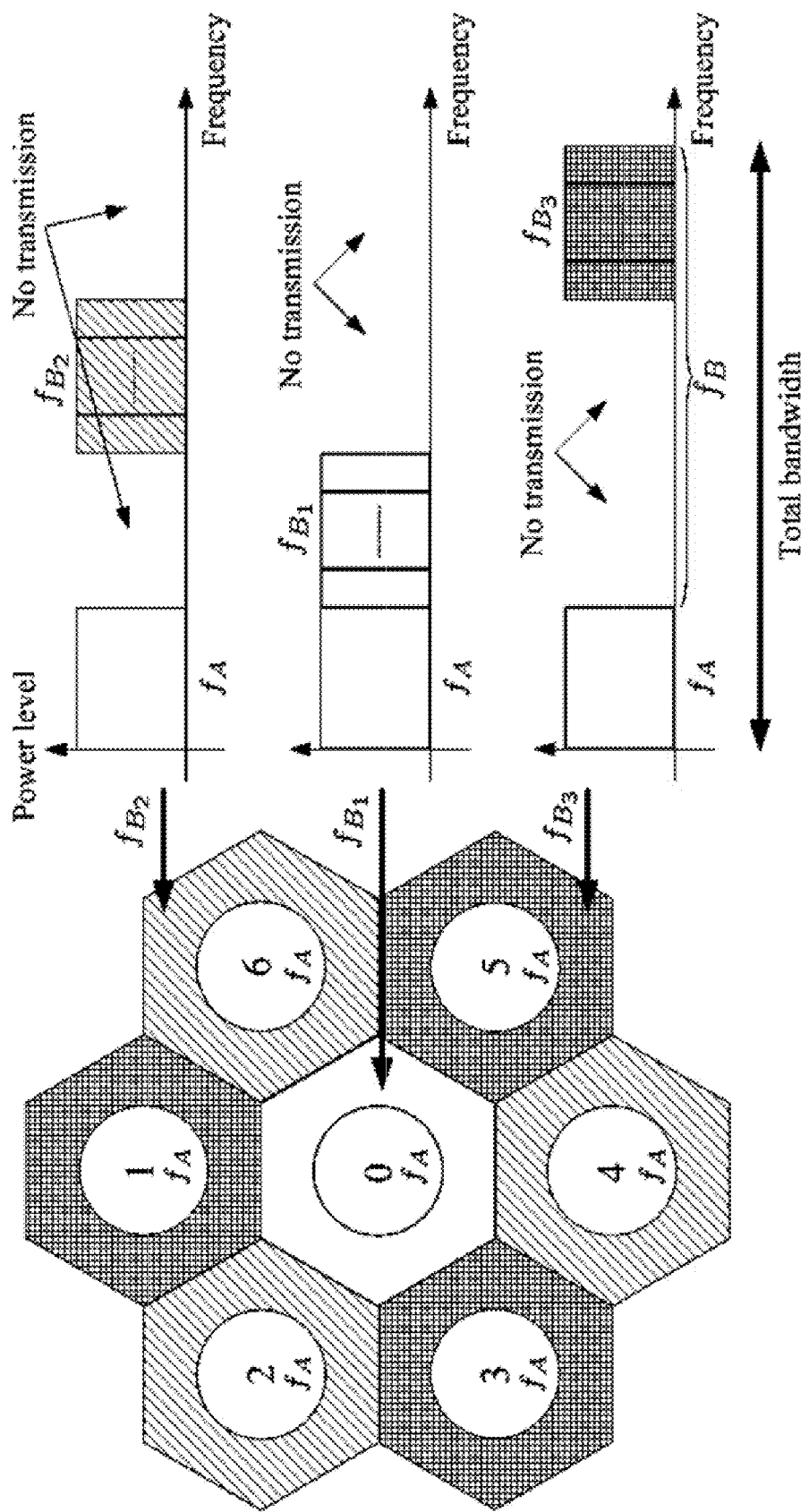
FIG. 9 illustrates an example of conventional FFR in a cellular system with omni-cells.

A practical implementation of three-cell FFR-based network MIMO for a wireless OFDM system is described next with reference to FIG. 8. The method may be implemented in the cellular system shown in FIG. 1.

First, a control server in the backhaul network (e.g. the inter-BS server 20 or a SON server 12 in FIG. 1) selects the BSs to be involved in collaborative network MIMO operation, defined as coordinated groups (step S81). Each group consists of three cells. The selection criteria is preferably based on geographic locations, i.e., the BSs selected to be in a coordinated group are typically located in nearby geographical areas which may result in significant interference to each other's serving MSs. The selection may also consider signaling latency, i.e., the control server may select cells that have high speed backhaul connection with lower signaling latency for the coordinated groups. The cellular system consists of multiple coordinated groups. Each BS may be involved in network MIMO operation of different groups, either under a rearranged frequency partition scheme or under a regular frequency partition scheme when TDMA or FDMA-based regrouping is practiced. Choosing between regular frequency partition and rearranged frequency partition is a part of step S81; cell regrouping under a regular frequency partition scheme (FIGS. 4A-4C) is also a part of step S81.

Then, within each coordinated group, the multiple BSs negotiate one or more common radio resource regions (composite time-frequency regions) for the network MIMO operation (step S82). Each common radio resource region, also called a collaborative zone, is s logical zone defined in time and frequency domains. A time domain resource unit may also be called a subframe; as mentioned earlier, a frequency resource unit is referred to as an RU. Time division and frequency division multiplexing may be practiced in this step. Each common radio resource region of a coordinated group is used to serve up to three MSs at a time, i.e., zero or one MS per BS. A restraint is that one BS cannot share the same common radio resource region for network MIMO operations associated with two different coordinated groups; to put it another way, the common radio resource regions used by one BS for two different coordinated groups cannot overlap. The negotiation may be conducted through the backhaul network which is connected to each BS. For example, the negotiation may be done by the BSs communicating their requests to the control server, and the control server allocating the common radio resource regions based on the requests.

In a practical wireless OFDM system, it will be difficult for multiple BSs to involve all of their serving MSs in the network MIMO operation. This is because the number of MSs, the traffic demand of each MS and the channel coherence time of each MS are usually different. For example, it will be difficult to coordinate the network MIMO operation if the sizes of radio resources required by each MS are different. Another example is that the MSs with higher speed are also hard to be involved in such operation because their channel response will be changed frequently, so that the signaling latency between different BSs before enabling this operation may already be longer than MS channel coherence time.

In the next step, each BS within the coordinated group selects one of its serving MS to be involved in network MIMO operation for each common radio resource region (step S83). The selection criteria may include selecting a MS with lower mobility and/or a MS under higher interference from the other BSs belong to the same coordinated group. The selected MSs will participate in the network MIMO operation in that common radio resource region.

When each BS selects a serving MS, the three BSs and the three selected MSs perform network MIMO in that common radio resource region so that the three signals transmitted by the three BSs achieve interference cancellation for the three selected serving MSs. In some situations, only one or two of the three BSs select their serving MSs to participate in network MIMO transmission in that common radio resource region, in which case the BSs that did not select their serving MSs will perform network MIMO transmission to achieve interference cancellation for the selected serving MSs.

In step S83, the selection decision is made by the BSs and the server. The MSs may solicit or trigger a selection, but do not make the selection decision.

After selecting the serving MSs, the BSs within each coordinated group and their selected serving MS perform necessary channel estimation and messaging exchange to construct the channel response matrix (step S84). More specifically, each selected serving MS estimates the channel response for the channel between it and each BS in the coordinated group, and then reports the channel response to its corresponding BS (its serving BS) for further forwarding to the control server. This step may be implemented by know techniques. For example, the BS may estimate the channel response from the sounding signal transmitted from the MS. Some examples are described below.

For TDD (Time Division Duplexing) mode, the BSs within the coordinated group negotiate the Uplink resources for their selected serving MSs to transmit sounding signals so that each BS in this group can estimate the channel response from the sounding signal transmitted from each selected serving MS. Because the channel response is reciprocal in a TDD system, the channel response matrix for both UL and DL can be constructed by this method.

For FDD (Frequency Division Duplexing) mode, each BS estimates the Uplink channel response from the selected serving MSs by the same sounding technique in the TDD mode. For the Downlink channel response, the MSs estimate the channel response by estimating the unique pilot pattern sequence transmitted by each BS in this coordinated group. For example, the pilot pattern transmitted by each BS can be scrambled with a sequence which is unique for each BS in this group. After channel estimation, each MS reports the estimated channel responses for each BS.

A control server in the backhaul network (e.g. the inter-BS server 20 or a SON server 12 in FIG. 1) collects channel responses reported by the BSs in the coordinated group and their selected serving MSs. Based on the complete channel response matrix obtained by the control server, the server calculates the weighting vector that should be applied to each BS for collaborative network MIMO transmission or reception (step S85). During network MIMO transmission, the control server synchronizes the data contents to be transmitted by the BSs of the coordinated group in the pre-negotiated radio resource regions to the MSs.

During network MIMO transmission, each BS monitors the received signal quality for the network MIMO transmission. When the signal quality begins to degrade, the BSs and MSs involved in this coordinated group and the server involved may repeat step S84 and S85 to update the weighting vector due to possible channel variation by user mobility. If the signal quality continues to degrade, the BSs in the coordinated groups may repeat step S83 to reselect the serving MSs to join network MIMO operation, and the BSs and the newly selected serving MSs repeat step S84 to obtain the channel response. If necessary or desired, the entire system may repeat step S81 to reconfigure the coordinated groups, and then repeat steps S82 to S85.

Steps S84 (channel estimation and feedback and messaging exchange) and S85 (collaborative network MIMO transmission) may be implemented by known techniques. For different cellular systems, the implementation of these steps may be different.

To summarize, the FFR-based three-cell network MIMO system according to embodiments of the present invention has many advantages. Compared to conventional network MIMO without cell sectoring, this system reduces inter-group interference (IGI) effect by using 3-secterized (directional antenna) frequency partition. As with conventional FFR, each cell full utilizes the entire frequency range, but improved signal quality is achieved in this system as compared to conventional FFR. It achieves desirable reduction of inter-group interference (IGI) even though a small coordination group size is used, i.e., only three cells. The small group size (three cells) reduces the computational complexity in implementation and the need for synchronization among a large number of cells. Using three-cell coordinated groups also improves service fairness; unlike larger (e.g. seven cell) coordinated groups, three-cell group does not have "edge" or "center" cell in the group.

It will be apparent to those skilled in the art that various modification and variations can be made in the FFR-based three-cell network MIMO system and related method and apparatus of the present invention without departing from the spirit or scope of the invention. Thus, it is intended that the present invention cover modifications and variations that come within the scope of the appended claims and their equivalents.

What is claimed is:

1. A cellular network comprising:
   a plurality of base stations each corresponding to a cell, each base station employing three directional antennas transmitting in three different directions using three different frequency bands, respectively, the three frequency bands used by the antennas of all base stations being the same three frequency bands; and
   at least one server connected to the plurality of base stations,
   wherein the server controls at least one group of three neighboring base stations among the plurality of base stations to coordinate their transmission within at least one of the three frequency bands in at least some time slots,
   wherein for each base station, the three directional antennas include a first antenna transmitting in a first direction using a first frequency band, a second antenna transmitting in a second direction using a second frequency band, and a third antenna transmitting in a third direction using a third frequency band, and
   wherein the server controls the at least one group of three base stations to coordinate their transmission within all three frequency bands during the at least some time slots,
   wherein the server controls a first group of three neighboring base stations among the plurality of base stations to coordinate their transmission within all three frequency bands in a first time slot, controls a second group of three neighboring base stations among the plurality of base stations to coordinate their transmission within all three frequency bands in a second time slot, and controls a third group of three neighboring base stations among the plurality of base stations to coordinate their transmission within all three frequency bands in a third time slot, the first, second and third group of three base stations have one common base station, wherein the first, second and third time slots are consecutive time slots.

2. A cellular network comprising:
   a plurality of base stations each corresponding to a cell, each base station employing three directional antennas transmitting in three different directions using three different frequency bands, respectively, the three frequency bands used by the antennas of all base stations being the same three frequency bands; and
   at least one server connected to the plurality of base stations,
   wherein the server controls at least one group of three neighboring base stations among the plurality of base stations to coordinate their transmission within at least one of the three frequency bands in at least some time slots,
   wherein the at least one group of three neighboring base stations includes a first group including a zeroth, a first, and a second base station, wherein for the zeroth base station, the three directional antennas include a first antenna transmitting in a first direction using a first frequency band, a second antenna transmitting in a second direction using a second frequency band, and a third antenna transmitting in a third direction using a third frequency band, wherein for the first base station, the three directional antennas include a first antenna transmitting in the first direction using the third frequency band, a second antenna transmitting in the second direction using the first frequency band, and a third antenna transmitting in the third direction using the second frequency band, and wherein for the second base station, the three directional antennas include a first antenna transmitting in the first direction using the second frequency band, a second antenna transmitting in the second direction using the third frequency band, and a third antenna transmitting in the third direction using the first frequency band, wherein the first antenna of the zeroth base station, the second antenna of the first base station and the third antenna of the second base station are oriented toward each other, and wherein the server controls the zeroth, first, and second base stations to coordinate their transmission within the first frequency band during all time slots.

3. The cellular network of claim 2, wherein the at least one group of three neighboring base stations further includes a second group including the zeroth, a third and a fourth base station, wherein for the third base station, the three directional antennas include a first antenna transmitting in the first direction using the third frequency band, a second antenna transmitting in the second direction using the first frequency band, and a third antenna transmitting in the third direction using the second frequency band, and wherein for the fourth base station, the three directional antennas include a first antenna transmitting in the first direction using the second frequency band, a second antenna transmitting in the second direction using the third frequency band, and a third antenna transmitting in the third direction using the first frequency band, wherein the second antenna of the zeroth base station, the third antenna of the third base station and the first antenna of the fourth base station are oriented toward each other, and wherein the server controls the zeroth, third and fourth base stations to coordinate their transmission within the second frequency band during all time slots, wherein the at least one group of three neighboring base stations further includes a third group including the zeroth, a fifth and a sixth base station, wherein for the fifth base station, the three directional antennas include a first antenna transmitting in the first direction using the third frequency band, a second antenna transmitting in the second direction using the first frequency band, and a third antenna transmitting in the third direction using the second frequency band, and wherein for the sixth base station, the three directional antennas include a first antenna transmitting in the first direction using the second frequency band, a second antenna transmitting in the second direction using the third frequency band, and a third antenna transmitting in the third direction using the first frequency band, wherein the third antenna of the zeroth base station, the first antenna of the fifth base station and the second antenna of the sixth base station are oriented toward each other, and wherein the server controls the zeroth, fifth and sixth base stations to coordinate their transmission within the third frequency band during all time slots.

4. The cellular network of claim 1, wherein the cells corresponding to the base stations are hexagonal shaped, and wherein each cell is comprises three rhombus shaped sectors corresponding to the three respective antennas each transmitting with a substantially 120-degree beam width.

5. The cellular network of claim 1, wherein the cells corresponding to the base stations are clover-leaf shaped, and wherein each cell comprises three hexagonal shaped sectors corresponding to the three respective antennas each transmitting with a substantially 60-degree beam width.

6. The cellular network of claim 1, wherein each base station further employs one omni-directional antenna transmitting in an inner region of the corresponding cell using a fourth frequency band, and wherein the omni-directional antennas of the plurality of base stations transmit without coordination with each other.

7. A method implemented in a wireless OFDM network, the wireless OFDM network comprising a plurality of base stations each transmitting in a plurality of radio resource regions and at least one server connected to the plurality of base stations, the method comprising:

the server defining a plurality of coordinated groups each comprising a plurality of base stations for coordinated MIMO (multiple-input multiple-output) signal transmission;

the base stations within each coordinated group negotiating one or more common radio resource regions for use in the coordinated MIMO signal transmission;

each base station within each coordinated group selecting zero or one serving mobile station for each common radio resource region to be served by the coordinated MIMO signal transmission;

within each coordinated group, the base stations and/or the selected serving mobile stations estimating channel response information for channels between the base stations and the serving mobile stations, and the base stations forwarding the channel response information to the server;

for each coordinated group, the server calculating, based on the channel response information received from the base stations, a weighting vector to be applied to signals transmitted by each base station in the coordinated group over each common radio resource region; and the server synchronizing data content of the signals transmitted by each base station over each common radio resource region to each selected serving mobile station.

8. The method of claim 7, wherein the server is connected to each base station through a backhaul network, wherein the server exchanges signaling messages and coordinates data traffic routed to each base station.

9. The method of claim 7, wherein each common radio resource region negotiated by the base stations within each coordinated group is a composite time-frequency region.

10. The method of claim 7, wherein at least one of the base stations belongs to two or more coordinated groups, and wherein the common radio resource regions negotiated by the base stations within different coordinated groups are non-overlapping.

11. The method of claim 7, wherein the plurality of coordinated groups defined by the server includes two or more coordinated groups containing a common base station, wherein for the common base station, the negotiated common radio resource regions within the two or more coordinated groups are non-overlapping.

12. The method of claim 7, wherein the defining step includes repeatedly re-defining the plurality of coordinated groups at different times.

13. The method of claim 7, wherein each of the plurality of coordinated groups defined by the server consists of three base stations.

14. The method of claim 7, wherein in the defining step, the server selects base stations that are geographically close to each other for the coordinated groups.

15. The method of claim 7, wherein in the defining step, the server selects base stations that have high speed backhaul connection with lower signaling latency for the coordinated groups.

16. The method of claim 7, wherein in the selecting step, each base station selects mobile stations that have lower mobility.

17. The method of claim 7, wherein in the selecting step, each base station selects mobile stations that experience higher interference level from other base stations in the same coordinated group.

18. The method of claim 7, wherein the estimating step includes each selected mobile station transmitting an uplink sounding sequence and the base stations estimating the uplink sounding sequence.

19. The method of claim 7, wherein the estimating step includes each selected mobile station estimating a pilot signals transmitted by each base station in the coordinated group, where each pilot signal is scrambled with a sequence unique to the transmitting base station.

20. The cellular network of claim 2, wherein the cells corresponding to the base stations are hexagonal shaped, and wherein each cell is comprises three rhombus shaped sectors corresponding to the three respective antennas each transmitting with a substantially 120-degree beam width.

21. The cellular network of claim 2, wherein the cells corresponding to the base stations are clover-leaf shaped, and wherein each cell comprises three hexagonal shaped sectors corresponding to the three respective antennas each transmitting with a substantially 60-degree beam width.

22. The cellular network of claim 2, wherein each base station further employs one omni-directional antenna transmitting in an inner region of the corresponding cell using a fourth frequency band, and wherein the omni-directional antennas of the plurality of base stations transmit without coordination with each other.

* * * * *